(12) United States Patent
Tran

(10) Patent No.: US 8,902,882 B2
(45) Date of Patent: Dec. 2, 2014

(54) SYSTEMS AND METHODS FOR PROVIDING CUSTOMER SUPPORT

(71) Applicant: Muse Green Investments LLC, Dover, DE (US)

(72) Inventor: Bao Q. Tran, Saratoga, CA (US)

(73) Assignee: Muse Green Investments LLC, Dover, DE (US)

( * ) Notice: Subject to any disclaimer, the term of this patent is extended or adjusted under 35 U.S.C. 154(b) by 0 days.

(21) Appl. No.: 13/679,677

(22) Filed: Nov. 16, 2012

(65) Prior Publication Data

US 2013/0080258 A1    Mar. 28, 2013

Related U.S. Application Data

(63) Continuation of application No. 12/797,469, filed on Jun. 9, 2010, now Pat. No. 8,665,865, which is a continuation of application No. 11/252,345, filed on Oct. 16, 2005, now Pat. No. 7,760,713.

(60) Provisional application No. 60/619,240, filed on Oct. 15, 2004, provisional application No. 60/619,243, filed on Oct. 15, 2004, provisional application No. 60/619,245, filed on Oct. 15, 2004.

(51) Int. Cl.
```
G06Q 30/06    (2012.01)
H04M 3/523    (2006.01)
G06Q 30/02    (2012.01)
G06Q 30/00    (2012.01)
H04M 3/51     (2006.01)
H04M 3/56     (2006.01)
```

(52) U.S. Cl.
CPC ......... *G06Q 30/0623* (2013.01); *H04M 3/5237* (2013.01); *G06Q 30/0273* (2013.01); *G06Q 30/0207* (2013.01); *H04M 3/567* (2013.01); *G06Q 30/0261* (2013.01); *G06Q 30/016* (2013.01); *H04M 3/5191* (2013.01); *G06Q 30/0267* (2013.01)
USPC ...... 370/356; 235/454; 348/207.99; 375/298; 379/93.14; 379/265.01; 382/104; 382/253; 455/3.06; 455/414.1; 701/29.4; 701/421; 702/183; 705/14.1; 705/14.64; 705/26.61; 705/27.1; 705/304; 707/693; 709/217; 709/223; 710/1; 725/105

(58) Field of Classification Search
CPC .......... H04N 1/00132; H04N 1/00188; H04N 1/00567; H04N 1/00633; H04N 5/2357
USPC ........... 370/356; 379/265.01, 93.14; 382/104, 382/253; 455/3.06, 414.1; 705/14.1, 14.64, 705/304, 26.61, 27, 26.81; 709/223; 725/105; 348/207.99; 375/298; 701/211, 29.4, 421; 702/183; 710/1, 710/29.4; 235/454; 707/693
See application file for complete search history.

(56) References Cited

U.S. PATENT DOCUMENTS 5,539,811 A  *  7/1996  Nakamura et al. ......... 379/93.14
5,678,002 A      10/1997  Fawcett
5,845,016 A  *  12/1998  Matsui et al. ................ 382/253

(Continued)

*Primary Examiner* — Gerald Gauthier
(74) *Attorney, Agent, or Firm* — Christensen O'Connor Johnson Kindness PLLC

(57) ABSTRACT

Systems and methods are disclosed for providing sales or customer support using a telephone having a camera to capture at least a partial image of a product or service; wherein the at least partial image is used to select a database updated by one or more knowledgeable persons on the product or service.

14 Claims, 2 Drawing Sheets

--- scan the product's descriptor using a camera (12)

place a call to a sales support telephone center (14)

route the call to a remote call center (16)

receive sales support from the remote call center (18)

(56) References Cited

U.S. PATENT DOCUMENTS

| | | | |
|---|---|---|---|
| 5,887,216 A | 3/1999 | Motoyama | |
| 5,933,811 A | 8/1999 | Angles | |
| 6,003,078 A | 12/1999 | Kodimer | |
| 6,089,455 A * | 7/2000 | Yagita | 235/454 |
| 6,215,783 B1 | 4/2001 | Neyman | |
| 6,295,551 B1 | 9/2001 | Roberts | |
| 6,327,363 B1 * | 12/2001 | Henderson et al. | 379/265.01 |
| 6,691,064 B2 * | 2/2004 | Vroman | 702/183 |
| 6,714,642 B2 | 3/2004 | Dhir | |
| 6,744,858 B1 | 6/2004 | Ryan | |
| 6,798,997 B1 | 9/2004 | Hayward | |
| 6,810,406 B2 * | 10/2004 | Schlabach et al. | 1/1 |
| 6,928,123 B2 * | 8/2005 | Zehavi | 375/298 |
| 6,950,829 B2 * | 9/2005 | Schlabach et al. | 1/1 |
| 6,968,367 B1 | 11/2005 | Vassar | |
| 6,976,251 B2 | 12/2005 | Meyerson | |
| 7,039,176 B2 | 5/2006 | Borodow | |
| 7,124,097 B2 | 10/2006 | Claremont | |
| 7,130,853 B2 | 10/2006 | Roller | |
| 7,142,842 B2 * | 11/2006 | Rooke et al. | 455/414.1 |
| 7,167,899 B2 | 1/2007 | Lee | |
| 7,209,817 B2 * | 4/2007 | Abdel-Malek et al. | 701/29.4 |
| 7,212,516 B1 | 5/2007 | O'Sullivan | |
| 7,233,980 B1 | 6/2007 | Holden | |
| 7,266,515 B2 * | 9/2007 | Costello et al. | 705/26.8 |
| 7,269,160 B1 | 9/2007 | Friedman | |
| 7,269,567 B1 | 9/2007 | Pletz | |
| 7,290,011 B2 * | 10/2007 | Eldar et al. | 707/693 |
| 7,290,247 B2 | 10/2007 | Moran | |
| 7,493,384 B1 | 2/2009 | Philyaw | |
| 7,742,999 B2 | 6/2010 | Moran | |
| 7,760,713 B2 * | 7/2010 | Tran | 370/356 |
| 7,941,270 B2 * | 5/2011 | Hughes | 701/421 |
| 8,195,526 B2 * | 6/2012 | Williams | 705/26.61 |
| 8,224,716 B2 * | 7/2012 | Walker et al. | 705/27.1 |
| 2001/0056367 A1 | 12/2001 | Herbert | |
| 2002/0026537 A1 * | 2/2002 | Schlabach et al. | 710/1 |
| 2002/0049765 A1 * | 4/2002 | Aruga | 707/100 |
| 2002/0059269 A1 * | 5/2002 | McQuown et al. | 707/100 |
| 2002/0076031 A1 | 6/2002 | Falcon | |
| 2002/0102938 A1 * | 8/2002 | Tsubaki et al. | 455/3.06 |
| 2002/0128875 A1 | 9/2002 | Parry | |
| 2002/0156692 A1 * | 10/2002 | Squeglia et al. | 705/26 |
| 2003/0179862 A1 | 9/2003 | Sierra | |
| 2003/0210806 A1 * | 11/2003 | Yoichi et al. | 382/104 |
| 2003/0212567 A1 * | 11/2003 | Shintani et al. | 705/1 |
| 2003/0229678 A1 * | 12/2003 | Wen et al. | 709/217 |
| 2003/0231241 A1 * | 12/2003 | Iida | 348/207.99 |
| 2004/0022237 A1 | 2/2004 | Elliott | |
| 2004/0117383 A1 | 6/2004 | Lee | |
| 2004/0117471 A1 * | 6/2004 | Nakamura | 709/223 |
| 2004/0117472 A1 * | 6/2004 | Masachika | 709/223 |
| 2004/0125940 A1 | 7/2004 | Turcan | |
| 2004/0243454 A1 * | 12/2004 | Yoshida | 705/7 |
| 2005/0091119 A1 | 4/2005 | Tuijn | |
| 2005/0165674 A1 | 7/2005 | Edwards | |
| 2005/0288953 A1 | 12/2005 | Zheng | |
| 2006/0053050 A1 | 3/2006 | Schweier | |
| 2006/0062375 A1 | 3/2006 | Pasquale | |
| 2006/0083225 A1 | 4/2006 | Tran | |
| 2009/0225764 A1 | 9/2009 | Flores | |
| 2010/0250452 A1 | 9/2010 | Moran | |
| 2010/0257032 A1 * | 10/2010 | Tran | 705/14.1 |
| 2012/0028620 A1 | 2/2012 | Roundtree | |
| 2013/0080258 A1 * | 3/2013 | Tran | 705/14.64 |

* cited by examiner

SYSTEMS AND METHODS FOR PROVIDING CUSTOMER SUPPORT

CROSS-REFERENCE(S) TO RELATED APPLICATION(S)

This application is a continuation of U.S. patent application Ser. No. 12/797,469, filed Jun. 9, 2010, which is a continuation of U.S. patent application Ser. No. 11/252,345, filed Oct. 16, 2005, now U.S. Pat. No. 7,760,713, which claims the benefit of U.S. Provisional Patent Application No. 60/619,240, filed Oct. 15, 2004, U.S. Provisional Patent Application No. 60/619,243, filed Oct. 15, 2004, and U.S. Provisional Patent Application No. 60/619,245, filed Oct. 15, 2004, the disclosures of which are incorporated by reference herein in their entirety.

BACKGROUND

Call centers are equipped and staffed for the provision to end-users of information services, especially technical support and reservation services. End-users may be: retail consumers, occupants of residential dwellings, hotel guests, tourists, employees of supply channel or distribution channel partners, consultants, internal staff, maintenance contract subscribers, travelers, among others.

Advanced call centers usually comprise: connectivity to public and private wide area networks, a call distribution system (either circuit switched or packet-switched, e.g., Voice over Internet Protocol, data call, instant message, for example), a local area network, applications software, World Wide Web servers, database servers, application servers, workstations, wide area network connectivity, and personnel who operate workstations or "seats" in the call center and interact with callers to the call center.

SUMMARY

Systems and methods are disclosed for providing sales support using a telephone having a camera to capture at least a partial image of a product or service; wherein the at least partial image is used to select a database updated by one or more knowledgeable persons on the product or service.

Advantages of the system may include one or more of the following. The system provides instant sales support to customers. The lead assignment, lead distribution, and lead maintenance are automatically determined based on operator knowledge/expertise and reduces subjectivity and manual decision-making that can often result in inefficiencies, as well as adverse attitudes from a person or persons who might feel slighted by a particular decision, i.e., regarding the assignment of a lead, for example. Further, the subjectivity and manual decision-making also add to the time-consuming nature of the assignment and distribution of leads.

The system also provides paperless leads distribution to agents. Lead information is electronically sent to the agents. The agents work on these leads, mark the outcome, and the outcome or disposition of the sales leads are automatically captured by the system. In addition, while the agent is working the lead, systemic tracking of activities on a given lead is performed.

Moreover, work can be cost-effectively distributed across continents. The system allows companies to increase profits by directly or indirectly "outsourcing" certain projects to areas of the world that have an abundant supply of cost effective labor.

DESCRIPTION OF THE DRAWINGS

The present disclosure can be more fully understood by reading the following detailed description together with the accompanying drawings, in which like reference indicators are used to designate like elements, and in which.

DETAILED DESCRIPTION

Figure 1:
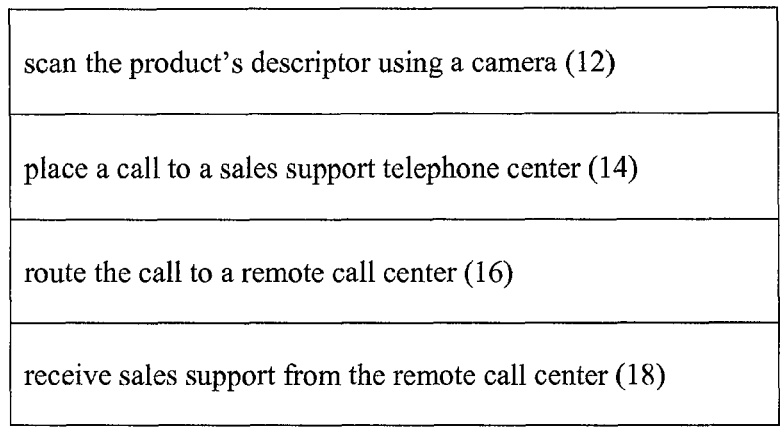
FIG. 1 shows a representative method for providing sales support using a call center.

FIG. 1 shows a representative process for providing sales support using a cell phone and a call center. A customer examines a particular product at a store and wishes to learn more about the product. To do this, the customer scans the product's descriptor using a camera at step 12; places a call to a sales support telephone center at step 14; routes the call to a remote call center at step 16; and receives sales support from the remote call center at step 18.

In one embodiment, the product descriptor is a bar code. The captured image of the bar code is decoded as digital data. The digital data is then used to route the call to an appropriate person in a remote call center that can assist the customer for sales support. The remote call center can be accessed over a satellite link or a fiber-optic link, for example.

Figure 2:
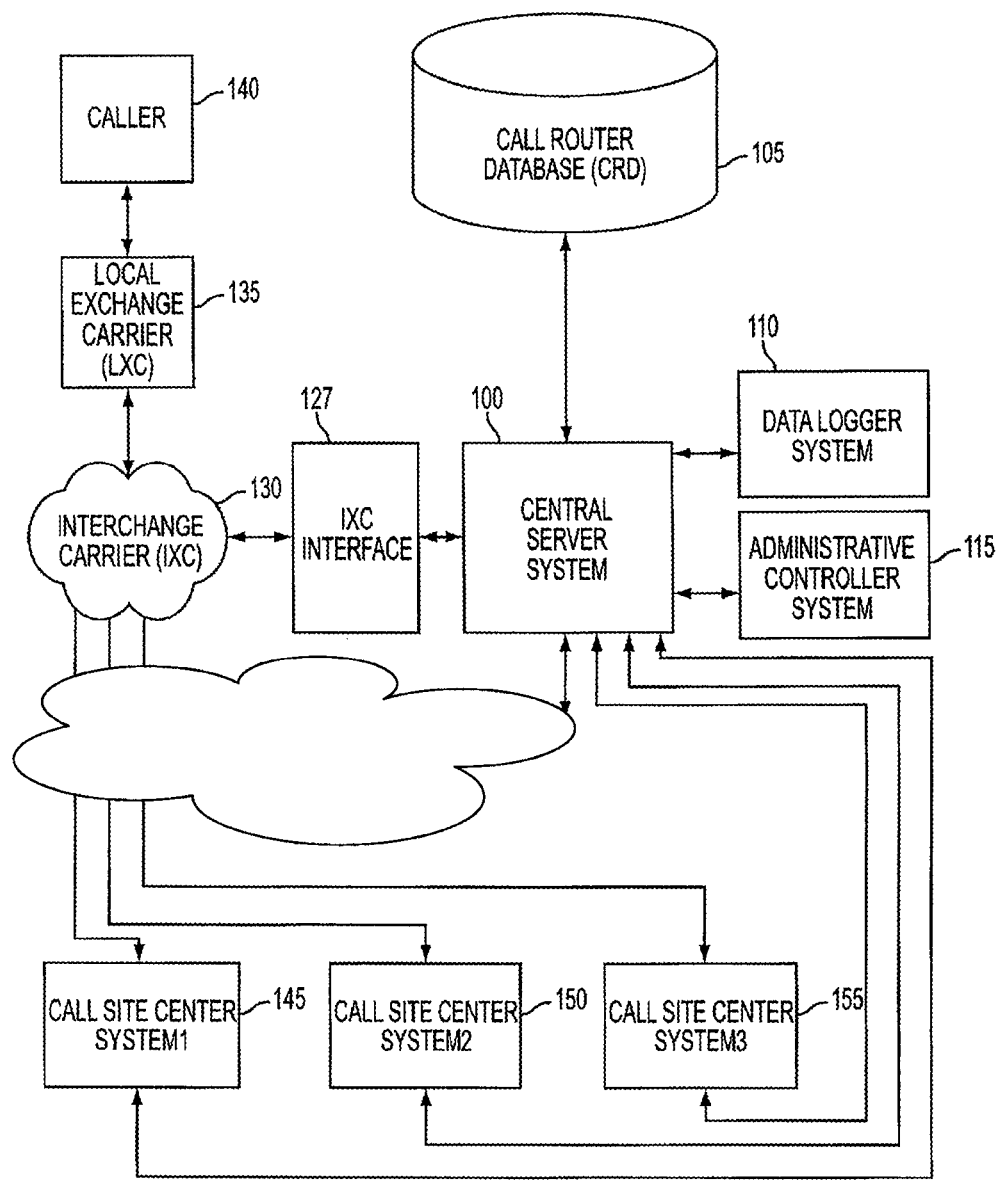
FIG. 2 shows a representative telecommunication structure.

FIG. 2 shows a representative telecommunications network that supports remote sales support. In one embodiment, the system includes a central server system 100, data logger system 110, administrative controller system 115, call router database (CRD) 105, call site center system 1 145, call site center system 2 150, call site center system 3 155, interexchange carrier (IXC) 130, IXC interface 127, local exchange carrier (LXC) 135, and caller 140.

Caller 140 represents the caller originating a call that is routed through the call routing system. The caller can be a consumer who seeks service from business concerns using the telephone. For example, a consumer seeking to place an order, schedule a delivery, file a complaint, or query an account balance, may place a call to a centralized number provided by a business concern. It is well known that businesses often provide such numbers as so-called toll-free "800" numbers, or the like.

Local exchange carrier (LXC) 135 represents the local phone network receiving a customer's call in a local area for forwarding to IXC 130. For example, a customer calling a toll-free 800 number is routed through his/her local phone network to the long distance network, IXC 130. IXC 130 represents the long distance carrier network that is controlled by central server system 100 to route calls to call sites and queues at the different geographic locations. While not depicted in FIG. 1, IXC 130 may further comprise a data access point (DAP) representing the point or node in the long distance switching network that receives return route address data to determine call destination.

The IXC 130 communicates over a network which can be ATM (Asynchronous Transfer Mode) with transport, switching, network management, and customer services built in. ATM is a protocol that handles multimedia traffic over wide area networks (WANs). The protocol is a connection-oriented cell-switched protocol developed for fiberoptic systems which have nearly error-free performance characteristics. The main features of ATM are guaranteed quality of service, ease of switching, and multimedia compliance. ATM can be easily switched because all switching and routing is performed by using only a 5 byte header. Thus, the switching can be performed with hardware. ATM is multimedia compliant because of the small cell size—a 5-byte header and a 48-byte payload. The small size allows cell delay (jitter) to be readily controlled—a necessity for multimedia transmission such as voice and video. The network may be satellite-based or fiber-optic cable based.

IXC interface 127 represents hardware/software that may be required to convert data transmitted between the IXC 130 and the central server system 100. Long distance carriers may have data formats (e.g., for the route request and return address) that differ among long distance providers and that may require conversion into a format usable by the central server system 100. The IXC interface 127 permits the integration of computers and telephony (often referred to as CTI or computer telephony integration) for the call routing system.

The IXC interface 127 communicates with the central server system 100. The central server system 100 provides centralized control over the call routing and includes hardware and software for supporting system administration, database management, carrier network interface, and call site center systems. In general, the central server system 100 receives routing requests from the interexchange carriers (IXC) 130. The central server system 100 processes routing requests, as well as other information, to issue a return route address to IXC 130 to control where a call is routed. As will be discussed in greater detail below, sometimes the return route address causes a call to be forwarded to an IVR system (not shown) and other times the call is forwarded to one of the call site center systems 145, 150, 155. While not depicted in FIG. 1, one or more backup servers may be provided for purposes of redundancy to ameliorate or eliminate the effects of crashes, malfunctions and the like.

Regarding the communication between the central server system 100 and the other system elements, the interface and protocol may comprise means familiar to those of skill in the art. The interface between system elements may be through direct connection or direct lines or may be over a network, such as the Internet, Wide Area Network (WAN), Local Area Network (LAN) or the like. In one embodiment, the call site center systems 1-3 (blocks 145, 150, 155) interface with the central server system 100 over a WAN. Regarding data format for non-voice data (such as real-time status information transmitted from peripherals to the central server system 100), TCP/IP protocol is used, although departures therefrom remain within the spirit and scope of the disclosure.

The central server system 100 also communicates with the data logger system 110 for logging activity of the call routing system. For example, the data logger system 110 may provide for the storage of records reflecting the path taken by every call entering the call routing system. The data logger system 110 may store records reflecting activity levels of various peripherals, such as call centers, so that system administration personnel can evaluate long term loading levels. The data logger system 110 may provide for storage of both short-term transactional data and long term historical data.

The central server system 100 also communicates with the call router database (CRD) 105 with storage means for storing data for the call router system. CRD 105 can be hard drives, CD-ROM, optical drives and so on. Generally, CRD 105 is accessed by the central server system 100 in order to retrieve customer identification and profile or behavior data in order to generate routing strategies and return addresses. The CRD 105 is also controlled by the central server system 100 to store transaction and history data reflecting activity on the call routing system.

Optionally, one or more interactive voice response (IVR) systems (not shown) collect information from callers (e.g., using touch-tone activated voice menus) in order to route calls to the proper target, such as to a qualified agent at a queue at a call site. In one embodiment, calls are first forwarded (i.e., pre-routed) to one of said IVR systems. Callers can receive automated servicing and access to their accounts using the touchstone controlled menus. Alternatively, callers seeking servicing by a live agent can "dial out" by entering "#" or the like. In that event, additional information can be received in order to recognize the proper account and provide the best return route address to the IXC 130. In this embodiment, once the return route address (e.g., for post-routing) is determined by the central server system 100, the call may be returned from the WR to the IXC 130 by using a technology such as so-called "take back and transfer" (TNT) technology supported by MCI Corp. Once the call is returned to the IXC 130, it is routed to the proper target in accordance with the return route address.

Call site center systems 1-3 (blocks 145, 150, 155) comprise call sites for receiving calls forwarded by the IXC 130. Generally, said call sites 145, 150, 155 will comprise one or more so-called peripherals capable of receiving calls, such as local VRUs, PBXs (Private Branch Exchange), and ACDs (Automatic Call Distributors). The call site center systems 145, 150, 155 generally include agents and agent workstations for human-assisted call processing, as further discussed below.

In one embodiment, each call site center system 145, 150, 155 interfaces with the central server system 100 over a WAN, although the interface could encompass other packet-switched technologies for communication between remote systems, such as via the Internet, World Wide Web, Internet Protocol Next Generation (IPng), Local Area Network (LAN) and the like. Central server call center interface (not shown) represents the hardware and software for the interface between the call site center systems 145, 150, 155 and the central server system 100 which, in some embodiments, employs so-called TCP/IP data communications protocol.

The system turns a telephone service operator into a partner of the company providing the call center. Service operator revenue comes from basic service fees to end-users (or to intermediaries, who in turn provide the system to end-users), but also from direct sales of goods and services, from advertising fees, and from commissions from online, and off-line, coupon-based, sales to end-users by participating merchants. Coupons can be bundled with merchants' advertisements, or can be distributed without a related advertisement. Coupons can be paper based or electronic. Electronic coupons are normally redeemed by transmission over the proximate area network serving the system to a point of sale. Normally, a PAN node closest to a system provides connectivity from the PAN node to the system. The point of sale can have a wired or wireless connection to the Network to complete the connection between the PAN node serving the system and the point of sale; if the point of sale has wireless connectivity to the network, it may be, but is not necessarily, served by the same PAN node that serves the system that is redeeming the coupon. Based on the subject matter of the inquiry from an end-user, advertisements related to inquiry subject matter could be displayed on the system. The advertisements could be coupled with coupons, and the coupons could be time sensitive electronic coupons, that is, the coupons must be redeemed with a limited period of time. Moreover, the mere proximity of a system, based on the detection of a proximate area network "announcement" transmission from the system by nearby PAN node, could trigger the transmission of advertisements and/or coupons to the System. The system announcement message normally discloses the preferences of the end-user, but usually not his or her identity or other personal information. User information (i.e., the system profile) is normally entered into the memory of a system when the system is initialized for a new end-user, and can be modified thereafter by a call center during a call or, optionally, by the end-user alone. The end-user preferences normally include shopping or procurement information such as the items, types of items, discount levels, quantities, etc., which the end-user seeks.

Software in the telephone can negotiate with software agents maintained by merchants and present an offer to the end-user on the display of the system in the end-user's language as the end-user passes a merchant's point of offer. (A point of offer is where product or service information is available but a sale cannot be transacted; for instance, there may be no inventory of goods at a point of offer and a purchaser may wish to inspect the goods before purchase. A point of sale is where goods are sold and can be delivered. A point of offer can connect an end-user to a point of sale. Like a point of sale, a point of offer can have a wired or wireless connection to the network to complete the connection between the PAN node serving the system and the point of offer; if the point of offer has wireless connectivity to the network, it may be, but is not necessarily, served by the same PAN node that serves the system that is receiving the offer.) The proximate area network "arrival announcement" and point of offer reply also has application in trade shows and commerce courts. If the location of the point of sale is not obvious or provided by a message from the point of offer, a call center can provide directions from the point of offer to the point of sale; providing a map and navigation service normally incurs a fee paid by the merchant to the service operator, since the service operator has control over the display of maps and navigation on the system. Alternatively, merchants could provide text directions from point of offer to point of sale as part of the exchange of messages over the proximate area network. A credit card swipe reader, stored value means, smart card, smart media, biometric reader, or voice reader built into the telephone or handheld wireless device, built into or interfaced with the phone can facilitate end-user authentication, sales transactions, and data entry.

In one embodiment, the service operator reserves the right to display advertising on the system. The end-user can be offered a reduced system rental rate in exchange for viewing, or viewing and responding to, a threshold number of advertisements. Possible responses include a purchase, participation in a market research survey, referral of a prospect, or other acts by the end-user. Alternatively, the terms of service can be that no advertisements, coupons, or promotional messages are permitted unless certain conditions are met, as determined by the service agreement with the end-user. Setup of the system to block or selectively permit advertisements and coupons normally increases the price to the end-user of each tier of service, since advertising revenue otherwise paid to the service operator decreases the price to the end-user of each tier of service. In a third approach to promotional messages delivered to a system, the end-user's high credit rating, purchasing authority, or other qualification criteria are validated, and such end-user's system would require payment to the end-user's stored value account in the system, shipment of a sample, or some other consideration in the end-user's or end-user's employer's or principal's favor, to enable the receipt of an advertisement, coupon, or other promotional message in the end-user's system; receipt of such a message can also trigger a payment by the merchant to the service operator for providing a qualified prospect. Non-electronic coupons, vouchers, or tickets related to the advertisements or purchases could be printed at printing stations provided by the operator, at any printer with an infrared or proximate area network interface, or forwarded to the address (hotel, business, or home) of the end-user.

Promotional messages delivered to a system can be multimedia. Additional sales information, documentation, etc., especially in the case of technical or costly items, could be sent to the end-user's attention at a network address for later retrieval by the end-user. The type of promotional message reflects the specific transaction. In a leisure market application, a tourist can be shown video on the system of a restaurant interior, entrees, entertainers, etc., to solicit a reservation or walk-in visit. In a business market application, a purchasing manager can be shown the product, installation methods, and testimonials by respected experts, customizations, etc.

Payment for purchases made by an end-user using a system can be made electronically and transmitted over the proximate area network, e.g., by debiting a stored value account in the system (the electronic equivalent of a cash sale), or by debit card, credit card, or charge card. Such electronic payments would normally be encrypted or made secure by other techniques known in the art. Alternatively, the end-user could make a physical payment, but would be rewarded for reporting physical payments to the service operator (e.g., the reward could be offsets against surcharges), which would enable the service operator to collect a sales commission from the merchant based on a sales receipt number or equivalent.

Sales of goods and services marketed by the operator (direct sales) would generate direct sales revenue for the operator. Sales of goods and services by a third party advertiser would generate commission revenue for the operator. When a purchase is made interactively in response to a third party's advertisement on the system, or by use of a coupon, the service operator earns a commission on the sale as negotiated by the service operator and the advertiser or merchant. The use of the service could be free to an end-user if a threshold amount of purchases are made; as discussed above, purchases could also generate credits that offset usage surcharges. Subject to information privacy laws or to contracts between the service operator and end-users, the history of transactions entered into by the end-user can be used for later marketing campaigns directed to end-users, for instance, to offer replenishment of consumables, upgrades, or replacements of items purchased by the end-user. For negotiations that did not lead to sales, merchants could send follow-up offers. For anonymous sales and for negotiations that did not lead to sales, the identity of the end-user can be shielded from the merchant by a screening service provided by the service operator. The operator of the service normally retains that end-user's account information online and the transaction history and preferences can be updated and used to extend suggestions and promotional messages to the end-user.

For leisure market segments, such as the travel industry, specified combinations and amounts (by time or packet) of: call center usage, Internet access, entertainment (e.g., live television and radio from the end-user's country or from other countries using an MPEG 4 or equivalent bitcasting feed or other digital compression technology), prerecorded programming, single player or multiplayer games, local, interstate and international voice calling, video calling between systems, specialized database or application server access, and other information services are aggregated into various "tiers" of service.

While this disclosure has been particularly shown and described with reference to representative embodiments thereof, it will be understood by those skilled in the art that various changes in form and details may be made therein without departing from the spirit and scope of the claimed subject matter.

The invention claimed is:

1. A method comprising:
receiving data decoded from an image of a graphical code associated with a product or service from a portable device having a camera configured to capture the image of the graphical code, wherein the portable device is configured to communicate the data decoded from the image of the graphical code; and
based on the data decoded from the image of the graphical code, selecting and initiating a connection to a data center comprising information relating to the product or service with which the graphical code is associated, wherein the data center is selected from a plurality of available data centers.

2. The method of claim 1, wherein the graphical code comprises a bar code.

3. The method of claim 1, wherein the portable device comprises a cellular telephone.

4. The method of claim 1, wherein the portable device comprises a handheld wireless device.

5. The method of claim 1, further comprising sending an offer to the portable device as the portable device passes a merchant's point of offer.

6. A system comprising:
a data center implemented in one or more server computers, the data center configured to provide support for a product or service in response to receipt of data decoded from an image of a graphical code associated with the product or service from a portable device having a camera configured to capture the image of the graphical code, wherein the portable device is configured to communicate the data decoded from the image of the graphical code, and wherein the data decoded from the image of the graphical code is used to select a database comprising data relating to the product or service with which the graphical code is associated from a plurality of available databases.

7. The system of claim 6, wherein the graphical code comprises a bar code.

8. The system of claim 6, wherein the portable device comprises a cellular telephone.

9. The system of claim 6, wherein the portable device comprises a handheld wireless device.

10. The system of claim 6, wherein the data center is further configured to distribute coupons or advertisements.

11. The system of claim 6, wherein the data center is further configured to redeem coupons or transmit coupons to the portable device.

12. A portable device comprising a camera and a storage medium, the storage medium comprising instructions configured to cause the portable device to:
capture an image of a graphical code associated with a product or service;
send data decoded from the image of the graphical code to a remote data center; and
establish a support connection with the remote data center based on the data decoded from the image of the graphical code, wherein the support connection relates to the product or service with which the graphical code is associated, and wherein the remote data center is selected from a plurality of available remote data centers based on the data decoded from the image of the graphical code.

13. The portable device of claim 12, wherein the support connection comprises a connection to a pre-selected person knowledgeable about the product or service.

14. The portable device of claim 12, wherein the graphical code comprises a bar code.

* * * * *